Nov. 30, 1937.   R. F. PEO ET AL   2,100,407
VALVING ASSEMBLY FOR HYDRAULIC SHOCK ABSORBERS
Filed Feb. 8, 1936   3 Sheets-Sheet 1
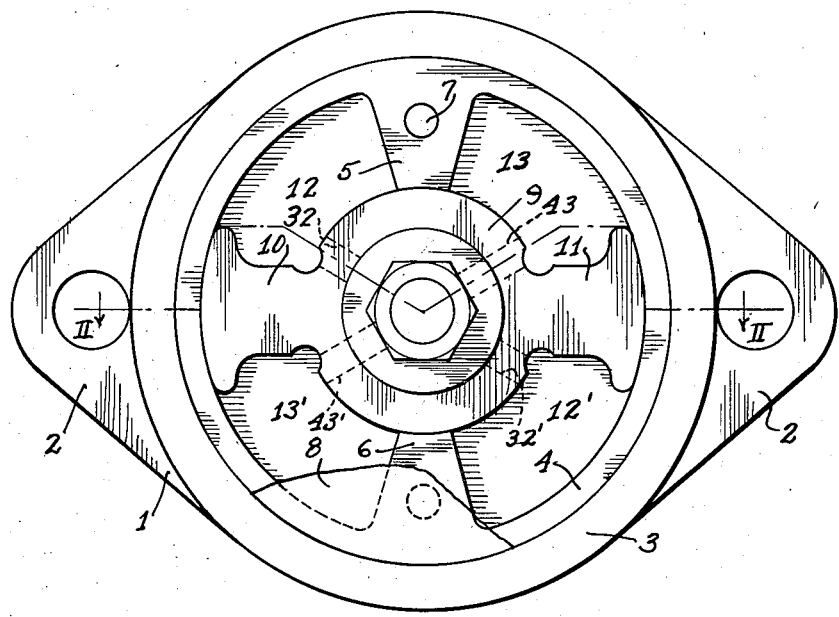
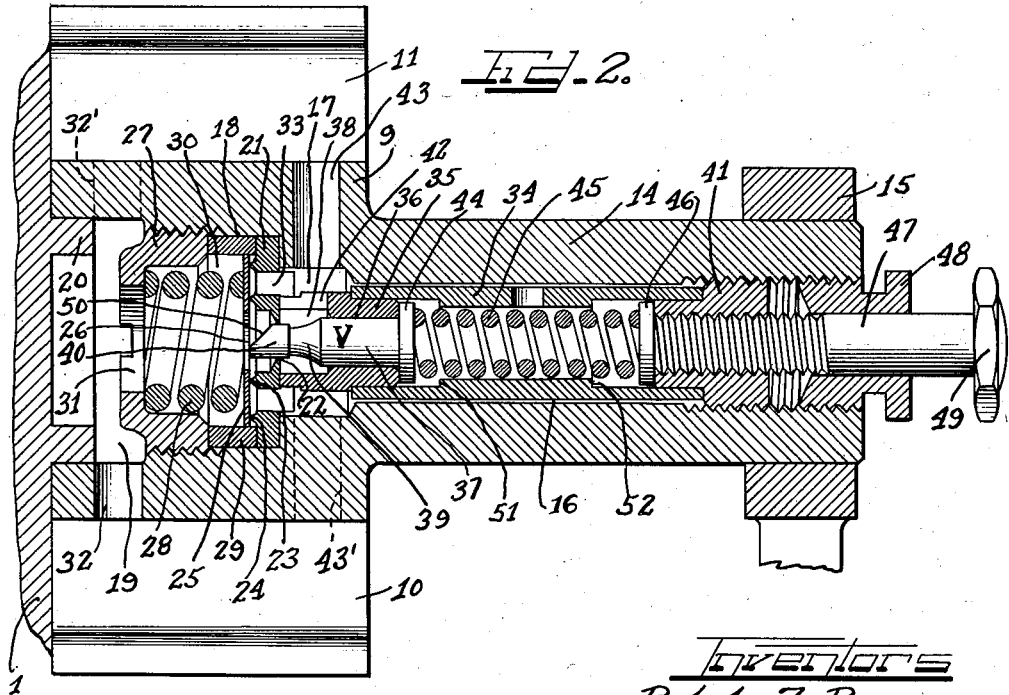
Inventors
Ralph F. Peo.
Carl F. Lautz.
Gervase M. Magrum.

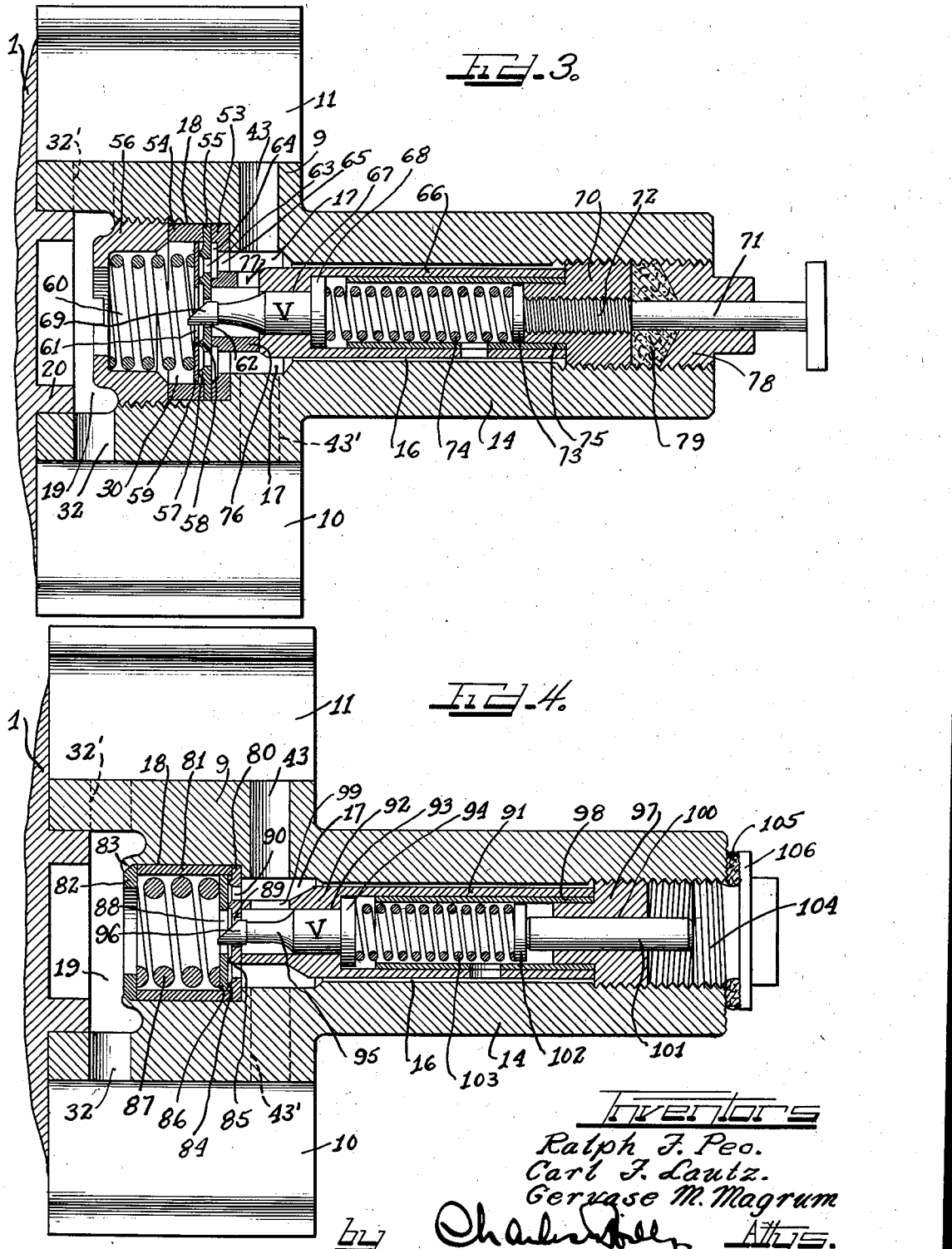

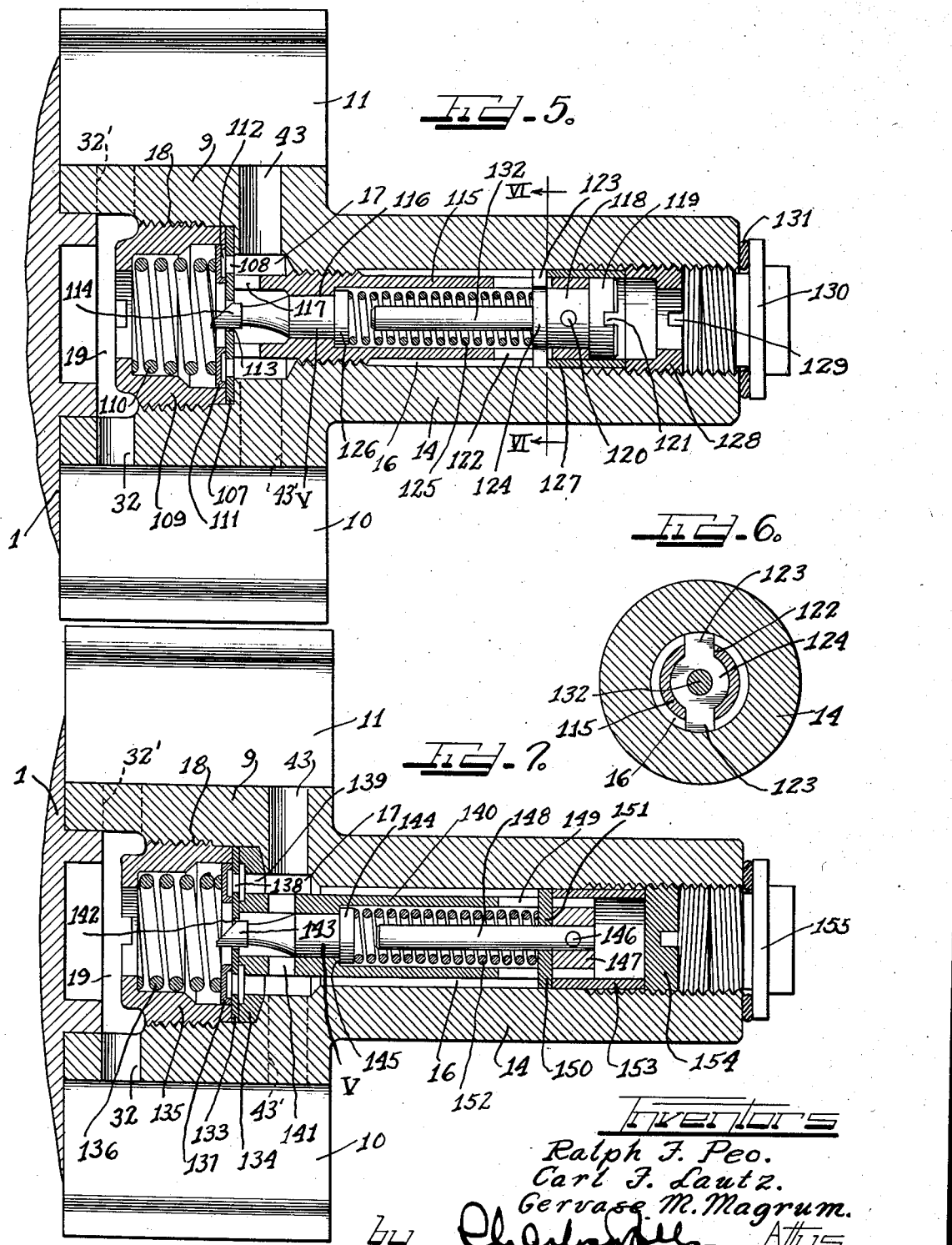

Patented Nov. 30, 1937

2,100,407

UNITED STATES PATENT OFFICE 2,100,407

VALVING ASSEMBLY FOR HYDRAULIC SHOCK ABSORBERS

Ralph F. Peo, Carl F. Lautz, and Gervase M. Magrum, Buffalo, N. Y., assignors to Houde Engineering Corporation, Buffalo, N. Y., a corporation of New York Application February 8, 1936, Serial No. 62,943

8 Claims. (Cl. 188—100)

This invention relates to a valving assembly adapted particularly for controlling the hydraulic fluid flow in shock absorbers applied to automotive vehicles.

An important object of the invention is to provide a valving assembly in which an axially movable valve plug cooperates with a metering orifice for metering of the fluid flow during rebound operation of the vehicle spring, with the valve plug normally held by a spring for metering of the fluid flow under normal pressure conditions but with the spring yielding for movement of the valve plug for increased orifice opening, together with means for adjusting the spring tension from the exterior of the shock absorber.

A further object of the invention is to provide in close association with the rebound flow controlling valve, a second valve, preferably of the disc type, for controlling the fluid flow during compression movement of the vehicle spring, with such second valve normally held in passage closing position by a spring and the fluid pressure and with the valve unseated by fluid pressure against the resistance of the spring during compression movement of the vehicle spring.

Another object of the invention is to provide an arrangement in which the rebound or high pressure flow controlling valve assembly may be withdrawn as a unitary assembly from the shock absorber for replacement thereof by another valving assembly of different characteristics.

A further important object is to make the movable valve elements light and so cooperable with their seats as to prevent noisy operation and to avoid pressure surges upon opening of the passageways controlled by these valves.

The above enumerated and other important features of the invention are embodied in the structure disclosed on the drawings, in which drawings:

Figure 1 is a plan view of a hydraulic shock absorber in which we have shown our valving assemblies applied, part of the shock absorber cover being removed;

Figure 2 is a section on plane II—II of Figure 1, showing one form of valving assembly for the shock absorber;

Figures 3, 4 and 5 show modified valving assemblies;

Figure 6 is a section on plane VI—VI of Figure 5; and

Figure 7 shows another modified valving arrangement.

The shock absorber to which we have shown the valving assembly applied is of the so-called rotary type. Briefly describing the structure, it comprises a base 1 having ears 2 for securing it to a support as for example the chassis of an automobile. The annular wall 3 extends from the base and within this wall is the ring 4 from which extends the abutment partitions 5 and 6, this ring structure being secured by pins 7 extending through the abutment partitions and into the base 1. The outer end of the annular wall 3 is closed by a cover structure 8 which may be secured by threaded engagement with the wall 3.

Within the ring 4 is the cylindrical piston hub 9 which extends between the abutment partitions 5 and 6 and which has piston vanes 10 and 11 extending therefrom for bearing engagement with the ring, this piston structure together with the partition members dividing the space within the ring and between the base and cover structure 8 into high pressure chambers 12 and 12' and low pressure chambers 13 and 13' from which the oil is displaced as the piston structure oscillates.

A shaft 14 extends from the piston hub 9 and at its outer end is journalled in the cover structure 8 in a well known manner, the shaft at its outer end having applied thereto a lever 15 (Fig. 2) for connection usually with the axle of the vehicle so that during relative movement between the chassis and axle the piston structure will be oscillated for displacement of the hydraulic fluid.

Referring to Figure 2, the shaft 14 has the axial bore 16 extending therethrough which communicates at its inner end with the counterbore 17 in the hub 9, the hub having the intermediate bore 18 of larger diameter and an end bore 19 of still larger diameter, the bore 19 receiving the bearing lug 20 extending from the base 1 for journalling the piston structure at its inner end. Seated in the bottom of the intermediate bore 18 is an orifice plate 21 having the passage or orifice 22 therethrough whose surrounding edge is comparatively sharp. On its inner side this orifice plate has the concentric annular seating ridges 23 and 24 for the valve disc 25 which has a central passageway in alignment with the orifice passageway 22. An abutment plug 27 threads into the end of the intermediate bore 18 and affords an abutment seat for one end of the spring 28 which at its other end abuts the valve disc 25 and tends to hold the valve disc against its seats 23 and 24. A bushing 29 is interposed between the plug 27 and the orifice plate 21 so that this orifice plate is securely held clamped in the bottom of the bore 18.

The plug, the bushing 29, and the orifice plate 21 form a valve chamber 30 for the valve disc and this chamber is connected by the passage 31 in the plug with the chamber or bore 19 which is connected by passages 32 and 32' with the high pressure hydraulic working chambers 12 and 12' of the shock absorber. The orifice plate 21 has ports 33 therethrough between the seating ridges 23 and 24, these ports connecting the bore or valve chamber 17 with the valve chamber 30 when the valve disc 25 is unseated.

Within the shaft bore 16 is the valving assembly for controlling the flow through the orifice passage 22 from the valve chamber 17 to the valve chamber 30. The valve assembly comprises a cylindrical sleeve 34 having secured in its inner end a guide head 35 having the cylindrical bore 36 for the body 37 of the valve V. The valve guide head 35 has the counterbore 38 at its inner end through which extend the neck 39 and the cylindrical plug end 40 of the valve, the plug end 40 projecting through the orifice 42 in the plate 21.

The sleeve 34 is secured at its outer end to a head 41 which has threaded engagement with the threaded end of the shaft bore 16. As shown, the heads 35 and 41 may be secured to the sleeve 34 by being press fitted into the ends thereof. When assembly is made, the threaded head 41 is screwed into the shaft bore until the end of the head 35 abuts the orifice plate 21, the head 35 having the passageway 42 connecting its bore 38 with the valve chamber 17, this valve chamber being connected by passages 43 and 43' with the low pressure working chambers 13 and 13' of the shock absorber.

The valve V has at its outer end a flange 44 which is within the sleeve 34 and normally held against the inner end of the head 35 by a spring 45 within the sleeve, the spring being abutted at its outer end by a washer 46 engaged by a screw 47 threading through the outer sleeve head 41, the screw extending to the exterior of the shaft bore through a gland 48 having threaded engagement in the outer end of the bore, the screw having a head 49 whereby it may be readily turned. By turning of this screw the pressure of the spring 45 against the valve V may be adjusted and the spring pressure tends to hold the valve in normal position with its plug end 40 within the orifice passage 22. The diameter of the valve end is somewhat less than the diameter of the orifice passage 22 in order to leave a normal passageway which is always open to fluid flow. At its ends, the valve plug is tapered or cut away on the bias as indicated at 50 so that when the valve is shifted inwardly the biased end communicates with the orifice passageway 22 for providing additional passageway for fluid flow.

Describing the operation, the various parts are normally in the position shown in Figure 2. During rebound movements of the vehicle spring with which the shock absorber is associated, the displaced hydraulic fluid flow will be from the high pressure working chambers 12 and 12' thru the passages 32 and 32' and into valve chamber 30, the pressure of the fluid against the valve disc 25 cooperating with the pressure of the spring 28 to hold the valve disc seated for closure of the passages 33. All of the fluid flow therefore, has to be through the orifice passage 22 and through the passages 43 and 43' to the low pressure hydraulic working chambers. Under normal pressure conditions the valve V will be held by the spring 45 in its normal outer position, but under abnormal pressure conditions the pressure against the valve will shift it inwardly to overcome the spring resistance and to move the biased end 50 of the valve into the orifice passage 22 for increasing the size of the passageway for fluid flow, and such increased passage remains until normal pressure conditions are restored and the valve is again returned to normal position.

During compression movements of the vehicle spring the fluid will flow from the low pressure working chambers 13 and 13' through the passages 43 and 43', and if the displaced fluid volume is too great, the orifice passage 22 will not be large enough to accommodate the flow and the pressure acting through the ports 33 against the valve disc 25 will unseat the valve for opening of the ports and for correspondingly increased fluid passageway, the fluid flowing through the passages 32 and 32' to the high pressure working chamber.

The valve disc 25 is made light and the seat rings 23 and 24 are so narrow edged that the area increment subject to pressure, as the valve opens, remains nearly constant, thus avoiding pressure surge when the valve opens. This arrangement also eliminates noise.

It will be noted that after the gland 48 has been withdrawn from the shaft bore, the entire rebound flow control valve assembly may be withdrawn as a unitary structure from the shaft bore by screwing out the head 41 from the bore. Replacement of a withdrawn valve assembly by another of different control characteristics may therefore readily be accomplished.

To limit the outward movement of the valve V by the fluid pressure, a stop shoulder 51 is provided on the sleeve 34 for engagement by the valve flange 44, and another shoulder 52 on the sleeve limits the inward movement of the washer 46 and protects the spring against overcompression by the screw 47.

In the modified arrangement shown in Figure 3, a backing plate 53 is seated in the bottom of the intermediate bore 18 and between this backing plate and the bushing 54 is clamped the orifice plate 55, the plug 56 threading into the end of the bore 18 engaging the bushing to clamp the various parts together. The orifice plate 55 has the outer and inner seating ridges 57 and 58 for the valve disc 59 which is normally held against the seat by the spring 60, the valve disc having the axial passageway 61 therethrough.

The orifice plate 55 has the orifice passage 62 in alignment with the valve disc passage 61 and the orifice plate has also the ports 63 therethrough communicating with the annular space between the seat ridges 57 and 58, and the annular chamber 64 in the backing plate 53, the backing plate having ports 65 therethrough communicating with the valve chamber 17 which is connected by passages 43 and 43' with the low pressure working chambers 13 and 13' of the shock absorber, the valve chamber 30 for the valve disc 59 being connected by passages 32 and 32' with the high pressure working chambers of the shock absorber.

The valve V is supported by the sleeve 66 in the shaft bore 16, the end of the sleeve having the bore 67 for the valve body whose flange 68 normally abuts against the inner side of the sleeve end. The biased cylindrical valve end 69 extends within the orifice passage 62 and is of less diameter than that of the orifice in order to leave a normal size orifice passage for the flow of the fluid during normal pressure conditions. The sleeve 66 at its outer end is secured to the plug 70 which has threaded connection in the end of the shaft bore 16. A stem 71 has the screw thread connection 72 with the threaded bore of the plug 70 and abuts a washer 73 which engages the outer end of the spring 74 which at its inner end abuts the valve flange 68 and tends to hold the valve structure in normal position. A bushing 75 lines the sleeve 66 and is secured by the sleeve to the plug 70, the bushing at its inner end forming a stop for limiting the outward movement of the valve structure V. The screw plug 70 is screwed in until the inner end of the sleeve 66 abuts the annular flange 76 extending outwardly from the backing plate 53, this sleeve having one or more ports 77 therethrough for connecting the interior thereof with the valve chamber 17. The screw stem 71 extends through a packing plug or gland 78 threading into the outer end of the shaft bore, to effect a seal against the escape of fluid from the shaft bore.

During rebound movement of the vehicle spring the displaced hydraulic fluid flows from the high pressure working chambers 12 and 12' through the passages 32 and 32' and into the valve chamber 30, the fluid pressure together with the pressure of the spring 60 holding the valve 59 seated so that all the fluid flow must be through the orifice passage 62, the fluid flowing into the interior of the extension 76 on the backing plate 53 and from there through ports 77 into chamber 17 and then through passages 43 and 43' to the low pressure working chambers 13 and 13' in the shock absorber. Under abnormal pressure conditions the spring 74 will yield so that the pressure may shift the valve V outwardly to expose its biased end to the orifice passage 62 for increasing the size of the passage for increased flow for relieving the excess pressure.

During compression movement of the vehicle spring the fluid displaced from the low pressure working chambers 13 and 13' flows through passages 43 and 43' into the chamber 17 and through ports 65 and 63 against the valve disc 59, the pressure overcoming the resistance of the spring 60 so that the valve disc is unseated to provide a low resistance path for fluid flow in addition to the path through the restricted orifice 62, the fluid flowing from the valve chamber 30 through passages 32 and 32' to the high pressure working chambers 12 and 12'.

In Figure 4 the valving arrangement is slightly modified over the arrangement shown in Figure 2. The orifice plate 80 is at the bottom of the intermediate bore 18 and is held in place by a bushing 81 whose outer end is engaged by a plate 82 which is secured as by deflecting over against the back thereof the metal at the outer corner of the bore 18, as indicated at 83. The orifice plate 80 has the outer and inner annular seat ridges 84 and 85 against which the valve disc 86 is normally held seated by the spring 87. The valve disc has the axial passageway 88 therethrough aligned with the orifice passages 89 in the orifice plate, the orifice plate having ports 90 between the seating ridges and communicating with the chamber 17, these ports being closed when the valve disc is seated.

The supporting structure for the valve V comprises a sleeve 91 having the head 92 whose bore 93 receives the valve V, the flange 94 at the inner end of the valve normally abutting against the inner side of the sleeve head 92. The neck 95 of the valve terminates in the biased cylindrical plug end 96 which engages in the orifice passage 89.

At its outer end the sleeve 91 is secured to a screw plug 97 having threaded engagement in the outer end of the shaft bore 16, the sleeve having the bushing 98 forming a stop for limiting the outward movement of the valve V. The plug 97 is screwed into the shaft bore until the end of the sleeve head 92 abuts against the orifice plate 80 between the port 90 and the orifice passage, the sleeve end having the port 99 connecting the bore 93 with the chamber 17.

The screw plug 97 has the axial bore 100 for slidably receiving a pin 101, this pin abutting at its inner end against a washer 102 which forms the abutment for the outer end of the spring 103 which at its inner end engages against the valve flange 94. The outer end of the pin 101 is abutted by the closure plug 104 threading into the outer end of the shaft bore to close the bore, packing 105 being interposed between the end of the shaft and the abutment flange 106 on the plug. With this arrangement, if it is desired to increase or decrease the spring tension against the valve V, the plug 104 can be removed and a longer or shorter pin 101 introduced. If greater spring tension is desired a longer pin is inserted and if less tension is desired a shorter pin is inserted, and when the plug 104 is screwed into position, the pin is shifted against the washer 102 and the spring 103 is tensioned to a degree corresponding to the length of the pin.

The operation of the assembly shown in Figure 4 is substantially the same as in the preceding assemblies, abnormal pressure during rebound operation of the vehicle spring causing the valve V to be shifted against the spring resistance for moving the biased end of the valve in the orifice passage for increased fluid passageway until normal pressure conditions are restored. During compression movement of the vehicle spring the valve disc 86 is unseated to provide a lower resistance path for the flow of the fluid from the low pressure chambers to the high pressure chambers of the shock absorber.

In the modified structure shown in Figure 5 we have substantially the same valve structure and arrangement as that shown in Figure 2, the orifice plate 107 being at the bottom of the bore 18 and provided with ports 108 communicating with the chamber 17 which is connected by passages 43 and 43' with the low pressure working chambers 13 and 13' of the shock absorber. A plug 109 having threaded engagement in the bore 18 holds the orifice plate in position, and the spring 110 within the plug holds the valve disc 111 normally seated against the orifice plate to close passageway through the ports 108, the valve disc having the annular channel 112 in communication with the ports. The orifice plate has the orifice passage 113 into which extends the biased end 114 of the valve V.

The valve V is supported by the sleeve 115 which at its inner end has threaded engagement with the shaft bore 16 and abuts against the orifice plate, the sleeve having the bore 116 in which the valve V is guided, the stem at its inner end having the passages 117 connecting the inner end of the sleeve bore with the chamber 17. At its outer end the sleeve 115 receives the lug 118 extending from the head 119, the sleeve being secured to the lug as by means of a pin 120. The head 119 has the screw driver slot 121 whereby the sleeve may readily be screwed into normal position of abutment against the orifice plate 107.

The sleeve 115 has opposite longitudinally extending guide slots 122 through which extend the radial arms 123 on an abutment washer 124 which is slidable within the sleeve and forms the outer abutment for the spring 125 which at its inner end engages the flange 126 of the valve V.

Within the shaft bore 16 is the bushing 127 which surrounds the outer end of the sleeve and the lug head 119, the bushing abutting at its inner end against the arms 123 of the abutment washer 124. Threading into the end of the shaft bore outside of the bushing 127 is the annular nut 128 having screw thread engagement with the shaft bore for abutting against the outer end of the bushing 127 so that by turning of the nut 128 the abutment washer 124 may be shifted for setting the tension of the spring 125. The nut has the screw driver slot 129 whereby it may be readily turned. A closure plug 130 is provided for the outer end of the shaft bore and packing 131 seals the shaft bore against leakage of fluid to the exterior thereof. A stop pin 132 is secured to and extends from the lug 118 and serves to limit the outward movement of the valve V by fluid pressure.

The operation of the structure of Figure 5 is substantially the same as that for the preceding valving assemblies, the fluid flow during rebound movement of the vehicle spring being from the high pressure working chambers through the passages 32 and 32' and through the plug 109 and from there through the orifice passage 113 and through passages 43 and 43' to the low pressure working chambers 13 and 13' of the shock absorber. Under abnormal pressure conditions the valve V will be shifted outwardly against the resistance of the spring 125 to bring the biased end of the valve into the orifice passage to thereby increase the size of this passage for increased flow area and relief of the excess pressure. During compression movement of the vehicle spring fluid flows from the low pressure working chambers 13 and 13' through the passages 43 and 43' and against the valve disc 111, the pressure unseating the disc so that the fluid may flow through the ports 108 and through passages 32 and 32' to the high pressure working chambers of the shock absorber.

In the modified arrangement shown in Figure 7 the orifice plate 133 is clamped between the back plate 134 and the plug 135, the spring 136 within the plug holding the valve disc 137 normally seated against the orifice plate to shut off the passage through the ports 138 in the orifice plate and the ports 139 in the back plate 134.

The backing plate 134 has the tubular extension 140 projecting into the shaft bore 16 and housing at its inner end the valve V, the extension having the ports 141 connecting the interior thereof with the chamber 17.

The orifice plate 133 has the orifice passage 142 into which projects the biased end 143 of the valve V, the valve flange 144 abutting normally against the shoulder 105 within the tubular extension 140.

Secured in the outer end of the tubular extension 140, as by means of a pin 146, is the plug 147 from which extends the stop pin 148 for limiting the outward movement of the valve V. The tubular extension has the opposite slots 149 through which extend the arms 150 of the abutment washer 151 for the spring 152 which normally holds the valve V seated against the shoulder 145. A bushing 153 surrounds the outer end of the extension 140 with its inner end abutting the arms of the spring abutment washer 151 and its outer end being engageable by a nut 154 threading in the outer end of the shaft bore 16 so that by turning of the nut the abutment washer 151 may be moved for setting of the spring 152 to the desired tension. A closure plug 155 is provided for the outer end of the shaft bore.

The operation of the structure of Figure 7 is substantially the same as that of the preceding structures, the fluid flow during rebound movement of the vehicle spring being solely through the orifice passage 142, which passage is increased in area upon abnormal pressure conditions when the valve V is shifted outwardly to bring the biased end thereof into the orifice passage. The low pressure flow, during compression movement of the vehicle spring, causes unseating of the valve disc 133 for reduced resistance passage flow for the fluid.

It will be noted that in the arrangement of Figure 7 the valving assembly, involving the valve V and its supporting tube extending from the backing plate 134, is a unitary assembly which is inserted into the shaft bore from the inner end thereof and then clamped in place by the plug 135. In the valving arrangements of the preceding figures the valving assembly involving the valve V is insertable into the shaft bore from the outer end thereof.

We thus produce simple and efficient valving assembly in which a valve is cooperable with an orifice passage for determining the resistance to the fluid flow during rebound movement of the vehicle spring, the valve being shiftable by excess pressure to increase the size of the orifice passage, the spring tension for resisting movement of the valve being adjustable from the exterior of the shock absorber, a check valve preferably in the form of a disc being intimately associated with the aforesaid valving structure to control the flow during compression movement of the vehicle spring.

Although we have shown various practical and efficient embodiments of the features of our invention we do not desire to be limited to the exact construction, arrangement and operation shown and described as changes and modifications may be made without departing from the scope of the invention.

We claim as follows:

1. A valving assembly for controlling the fluid flow in a hydraulic shock absorber, comprising an orifice plate having an orifice passage therethrough, a valve plug having a tapered outer end engaging in said orifice passage to define therewith an annular orifice, said valve plug being shiftable by fluid pressure in one direction for exposing more or less of its beveled end to said orifice to thereby increase the orifice area, a guide support for said valve plug and a tension spring therein resisting axial movement of the valve plug, said orifice plate having ports therethrough independently of said orifice, a valve disc seated against said orifice plate, a spring yieldably holding said valve disc seated for closure of said ports, said valve disc being arranged to be unseated by fluid flow in the opposite direction for exposure of said ports to such flow.

2. A valving assembly for controlling the fluid flow in a hydraulic shock absorber, comprising an orifice plate having an orifice passage therethrough, a valve plug having a tapered outer end engaging in said orifice passage to define therewith an annular orifice, said valve plug being shiftable by fluid pressure in one direction for exposing more or less of its beveled end to said orifice to thereby increase the orifice area, a guide support for said valve plug and a tension spring therein resisting axial movement of the valve plug, said orifice plate having ports therethrough independently of said orifice, a valve disc seated against said orifice plate, a spring yieldably holding said valve disc seated for closure of said ports, said valve disc being arranged to be unseated by fluid flow in the opposite direction for exposure of said ports to such flow, and means for adjusting the tension of the first mentioned spring.

3. Valving assembly for controlling the fluid flow in a hydraulic shock absorber, comprising an orifice plate having a passage therethrough, a valve plug having an end in said orifice passage and cooperating therewith to define a restricted annular orifice, said valve being arranged to be shifted axially by fluid pressure in one direction and being shaped to effect increase of the size of said orifice in accordance with increasing fluid pressure, a spring resisting axial movement of said valve, said orifice plate having a port therethrough, a check valve for seating against said orifice plate, a spring yieldably holding said check valve seated for closure of said port, said check valve being unseated by fluid flow in the opposite direction for exposure of said port to said flow.

4. A valving assembly for controlling the fluid flow in a hydraulic shock absorber, comprising an orifice member having an orifice passage therethrough, a valve plug having an end projecting into said orifice passage to partially close said passage to leave a restricted annular orifice, said valve plug being arranged for axial movement away from said orifice member by abnormal pressure of fluid flow in one direction and the valve end being shaped to effect increase in the size of said orifice during such axial movement, a spring abutment, a spring between said abutment and said valve plug tensioned to resist axial movement of said valve plug, means for shifting said spring abutment for adjustment of the spring tension, said orifice member having ports therethrough, a check valve for seating on said orifice member to control said ports, a spring resisting unseating of said check valve, the pressure of the fluid flow in the opposite direction causing unseating of said check valve for exposure of said ports to the fluid flow.

5. A valving assembly for controlling the fluid flow in a hydraulic shock absorber, comprising a plate having a passageway therethrough, a valve plug having an end projecting into said passage to define an annular orifice, said valve plug being adapted to be shifted axially and its end being shaped for effecting variation in the size of said orifice during said shifting, a supporting structure for said valve plug in which said valve plug is supported at one end, a supporting head for the other end of said supporting structure, a spring abutment movable in said supporting structure, a spring between said abutment and said valve plug for resisting axial movement of said valve plug, said supporting structure head having a bore therethrough for receiving abutment pins of various lengths, and an inserted abutment pin engaging at its inner end with said spring abutment member, and means engageable with the outer end of said pin for effecting shift thereof and of said spring abutment member for adjustment of the spring tension.

6. A valving assembly for controlling the flow of fluid in a hydraulic shock absorber, comprising an orifice member having an orifice opening, a valve plug having a tapered end engaging in said orifice opening to control the size thereof, a tubular supporting frame providing a guide support at its inner end for said valve plug and having an internal shoulder, said valve plug having a flange for engagement with said shoulder, a head for said tubular frame having an axial bore, a spring abutment member within said frame, a spring interposed between said abutment member and the valve plug flange for yieldably holding said valve plug in normal position for the normal size of said orifice, the fluid pressure against said valve tending to shift it against the spring resistance for increased opening of said orifice, an abutment member outside of said supporting frame head and a pin in said supporting structure head bore shiftable by said outer abutment against said spring abutment washer for movement of said spring abutment to adjust the tension of said spring, the length of said pin determining the degree of tensioning of said spring.

7. A valving assembly for controlling the fluid flow in a hydraulic shock absorber, comprising a piston structure having a bore therethrough and operable between high and low pressure hydraulic working chambers and having passageways connecting said high and low pressure working chambers respectively with said bore, said valving assembly comprising an orifice member in the inner end of said bore and interposed between the high and low pressure flow passages, a supporting frame in the outer end of said piston structure bore, said orifice plate having an orifice passage therethrough, a valve plug axially shiftable in the inner end of said supporting frame and having an end projecting into said orifice passage and shaped to vary the size of said orifice passage when the valve plug shifts axially, a supporting head for said supporting frame having threaded engagement in said piston structure bore, a spring abutment member within said supporting frame, a spring between said abutment member and the valve plug tending to hold said valve plug in position for normal size of said orifice, an abutment member having threaded engagement in the outer end of the piston structure bore, said supporting frame head having an axial passage therethrough, and a pin in said head bore passageway for engaging at its inner end with said spring abutment member, the outer end of said pin being engaged by said threaded abutment member for longitudinal shift of said pin and movement of said spring abutment member for adjusting the tension of said spring.

8. A valving assembly for controlling the fluid flow in a hydraulic shock absorber comprising means providing a fluid flow passageway, a valve plug for controlling the flow through said passageway, a supporting structure for said valve plug in which said valve plug is axially shiftable at one end for cooperation with said passageway, a supporting head for the other end of said supporting structure, a spring abutment movable in said supporting structure, a spring between said abutment and said valve plug for resisting axial movement of said valve plug, said supporting structure head having a bore therethrough for receiving abutment pins of various lengths, an inserted abutment pin engaging at its inner end with said spring abutment member, and means engageable with the outer end of said pin for effecting shift thereof and of said spring abutment member for adjustment of the spring tension.

RALPH F. PEO.
CARL F. LAUTZ.
GERVASE M. MAGRUM.